W. G. Lumbard,
Drag Saw.

No. 52,304.  Patented Jan. 30, 1866.

Witnesses

Inventor

UNITED STATES PATENT OFFICE.

W. G. LUMBARD, OF GEORGETOWN, ILLINOIS.

IMPROVEMENT IN SAWING-MACHINES.

Specification forming part of Letters Patent No. 52,304, dated January 30, 1866.

*To all whom it may concern:*

Be it known that I, WILLIAM G. LUMBARD, of Georgetown, in the county of Vermillion and State of Illinois, have invented a new and useful Improvement in Sawing-Machines; and I do hereby declare that the following is a full, clear, and exact description thereof, which will enable others skilled in the art to make and use the same, reference being had to the accompanying drawings, forming part of this specification, in which—

Figure 1:
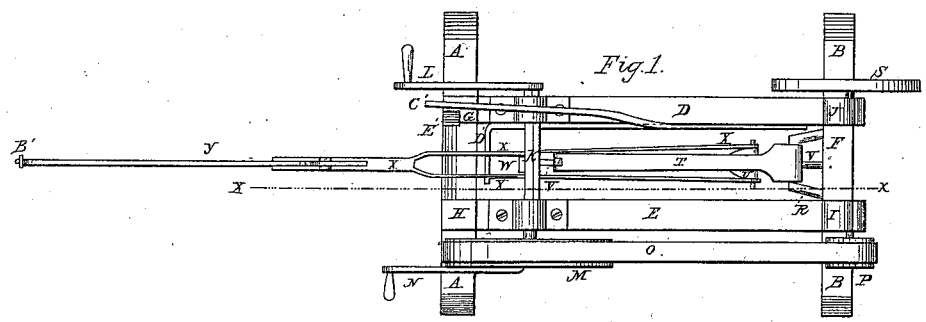
Figure 2:
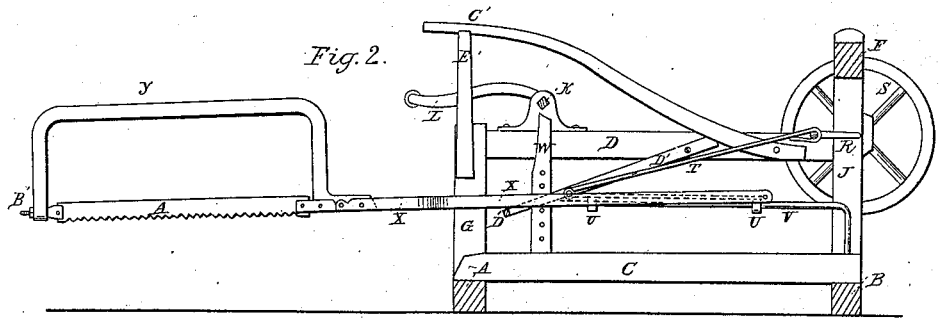

Figure 1 is a top or plan view of my improved sawing-machine. Fig. 2 is a vertical section through the line $xx$, Fig. 1.

Similar letters of reference indicate like parts.

My invention has for its object the furnishing a hand-power sawing-machine for private or domestic use; and it consists in a machine formed by combining and arranging the parts with each other and with the frame that supports them, as hereinafter more fully described.

A B are the ground-sills, upon which the machine stands, and which are made of sufficient length to furnish a firm and stable foundation. C D E are the longitudinal beams, F the cross-beam, and G H I J the uprights or posts of the frame.

K is the pulley-shaft, by which motion is communicated to the machine. To one end of the shaft K is attached the crank L, and to the other end or to the pulley M is attached the crank N. The machine may be operated by using one or both of the cranks, L and N, as the size of the timber sawed may require.

O is a belt passing around the pulleys M and P, by means of which motion is transmitted from the shaft K to the driving or crank shaft R, to the end of which shaft the pulley P is attached. The balance-wheel S is attached to the end of the shaft R opposite to the pulley P. Between the posts I and J the shaft R is bent at right angles to its axis of revolution, so as to form a crank, and to the crank thus formed is attached one end of the pitman T, the other end of which is attached to the forward end of the slide U, which said slide slides forward and backward upon the stationary rod V, the rear end of which rod is bent at right angles and attached to the longitudinal beam C, as shown in Fig. 2, and the front end is attached to and supported by the post W.

The rear end of the double pitman X is pivoted to the rear end of the slide U, and to its forward end is attached the saw-strainer Y. The saw A' is attached to the strainer Y by screws or rivets, as represented in Fig. 2, and is tightened or strained by screwing up the nut B', the elasticity of the strainer holding it taut. The saw-strainer Y is attached to the forward end of the double pitman X by two pins or screws, as seen in Fig. 2. By removing one of these the saw and strainer may be raised to a vertical position for convenience in dressing the saw.

The saw is raised, when required, by means of the levers C' and D', both of which are pivoted to the longitudinal beam D, as shown in Fig. 2. By depressing the long arm of the lever C' said lever bears upon and depresses the short arm of the lever D', thereby elevating the long arm of the said lever D', and with it the forward end of the double pitman X, and also the saw-strainer and saw. The spring-catch E' takes hold of the long arm of the lever C' when depressed, and holds the saw elevated while the machine is being moved along the log into a position for making another cut, or while sticks of wood are being placed before the machine to be sawed. Then by moving back the spring-catch E' the saw may be lowered upon the timber and the machine started. The saw rides upon the timber, and is held to its work by its own weight and the weight of the strainer Y and the pitman X.

When the stick is sawed through the saw is kept from dropping to the ground by the pitman X coming in contact with and resting upon a pin passed through one of a series of holes in the post W, as seen in Fig. 2, the height at which the pin is placed being determined by the distance from the ground at which the timber to be sawed is supported.

I claim as new, and desire to secure by Letters Patent—

A sawing-machine constructed and arranged substantially as described, and for the purpose set forth.

The above specification of my invention signed by me this 16th day of November, 1865.

WM. G. LUMBARD.

Witnesses:
    JAMES F. SWAPP, Jr.,
    FLETCHER SMITH.